Patented July 15, 1952

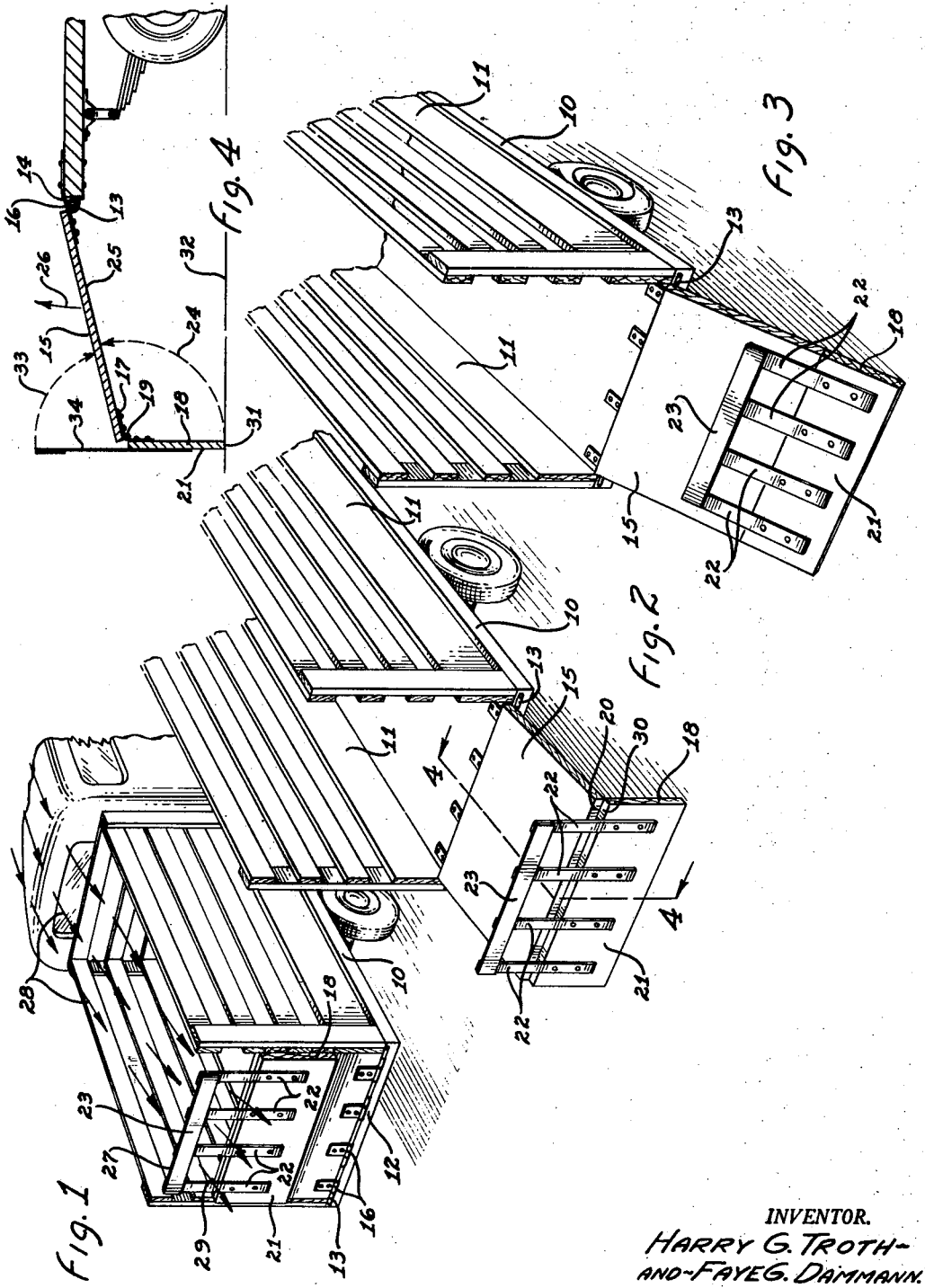

2,603,529

UNITED STATES PATENT OFFICE 2,603,529

FOLDING TAIL GATE

Harry G. Troth and Faye G. Dammann, Phoenix, Ariz.

Application September 27, 1951, Serial No. 248,586

4 Claims. (Cl. 296—61)

This invention pertains to improvements in folding tail gates for stock carrying vehicles and is particularly adapted to vehicles for use on the farm or range in transporting animals from one point to another with ease and facility.

One of the objects of this invention is to provide an improved tail gate for stock carrying vehicle which requires a minimum of effort in manipulation from totally closed to fully opened position for removal of stock from the vehicle.

Another object of this invention is to provide an improved folding tail gate for a stock carrying vehicle which is relatively light in weight but which fully closes the rear gate portion of the vehicle without projecting above the normal side rails thereof.

Still another object of this invention is to provide an improved tail gate for stock carrying vehicle which may fold up in such a manner as to produce a minimum wind resistance against the forward movement of the vehicle.

It is also an object of this invention to provide an improved folding tail gate for stock carrying vehicle which utilizes a cross bar frame arrangement which acts in upper position as the rear upper portion of the load carrying body of the truck while allowing air movement from the forward movement of the vehicle to pass therethrough and which functions as a railing or stop for a substantially horizontal portion of the tail gate when used in an intermediate position for carrying tools or serving a dinner thereon or for other purposes where a table like arrangement is desired, and in which the same member functions thirdly as the main structural element for the tail gate when in fully lowered position and also as a cleat to facilitate getting the stock into and out of the vehicle.

Further features and advantages of this invention will appear from a detailed description of the drawings in which:

Fig. 1 is a rear perspective view of a stock carrying vehicle having a folding tail gate incorporating the features of this invention, showing the gate in full up closed position for traveling of the vehicle.

Fig. 2 shows an intermediate position for the tail gate to be used as a table structure.

Fig. 3 is a view showing the tail gate in fully lowered position for entering or removing stock from the vehicle.

Fig. 4 is a section on the line 4—4 of Fig. 2.

As exemplary of one embodiment of this invention there is shown a vehicle having a stock carrying body comprising a floor 10 and side frame members 11 appropriately secured to the bottom 10 in a well known manner. Along the rear edge 12 of the bottom 10 there is provided a detachable hinge construction which may take the form of a cylindrical pipe member 13 appropriately secured by suitable brackets 14 to the rear edge 12 of the bottom 10 of the vehicle body.

A novel folding tail gate structure comprises a member 15 connected by suitable detachable hinge means 16 to the bar member 13 of the bottom 10 of the vehicle and having at its other end a hinge member 17 to which is connected the member 18 so that the member 18 is pivotally mounted about an axis 19 on the outer end 20 of the member 15.

On the outer race 21 of the member 18 there is fixed a plurality of upwardly extending bar members 22 which terminate in a common horizontally disposed bar member 23 securely welded or otherwise fastened to the outer end of the members 22.

In Fig. 1 is shown the folding tail gate arranged for traveling movement of the vehicle in which case the member 18 is swung back around the axis 19 of the hinge 17 as indicated by the arrow 24 in Fig. 4 against the bottom face 25 of the member 15 and the member 15 is swung upwardly as indicated by the arrow 26 to vertical position so as to form the completely closed tail gate arrangement. It is important to note that in this unique design the member 23 has its top edge 27 of substantially equal height with the side rail members 11 so as to form a complete and full enclosure for the vehicle body which neither projects above or is below the general height level for the vehicle body. Further, air movement during the forward movement of the vehicle as indicated by the arrows 28 may freely pass through the upper portion of the tail gate formed by the openings 29 between the member 23 and the top edge 20 of the member 15 and the edge 30 of the member 18 so as to prevent unnecessary drag in the operation of the vehicle and also prevent bad air current circulation within the vehicle itself which would be annoying and detrimental to stock being carried in the vehicle.

In Fig. 2 is shown an intermediate position for the tail gate in that the bottom edge 31 of the member 18 engages the ground surface 32 with the member 18 in substantially vertical position as shown in Figs. 2 and 4. In this arrangement the member 15 is in substantially a horizontal position so as to function as a table for tending to chores around the ranch or farm where used. It will be noted that in this position the members 22 and cross bar 23 function as a railing or stop for the slightly downwardly sloping portion 15 of the tail gate structure.

In Fig. 3 is the final disposition of the folding tail gate structure brought about when the member 18 is swung in the direction indicated by the arrow 33 with the back face 34 of the members 22 engaging the top surface of the member 15 so as to form a continuous properly sloping tail gate or ramp for entrance or removal of livestock from the vehicle. It is important to note when in this position that the cross member 23 also functions as a cleat to prevent slipping of the animals in getting into or out of the vehicle.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed as new and desired to be obtained by United States Letters Patent is:

1. In a folding tail gate for a stock carrying vehicle, a first member, means for pivotally mounting one edge of said first member for swinging movement about a horizontal axis on the rear end of the vehicle bottom, a second member pivotally mounted for horizontal swinging movement about an axis along the other edge of said first member and parallel to the mounting of said first member on said vehicle body, a plurality of substantially vertically disposed bar members fixed on the outer upper face of said second member and projecting upwardly above the pivotal connection of said second member with said first member, and cross bar means secured to the outer ends of said vertically disposed bar members.

2. A folding tail gate for a stock carry vehicle comprising a first gate member having one edge hingedly mounted along the rear edge of the vehicle body bottom, a second gate member pivotally mounted on the other edge of said first member for swinging about an axis parallel to said first mentioned hinged connection with the truck body, a plurality of bar members fixed to the outer upper face of said second gate member and projecting above and beyond the pivotal connection of said second member with said first member, and bar means interconnecting the outer ends of all of said vertically disposed bar members.

3. A folding tail gate for a stock carrying vehicle comprising a first gate member having one edge hingedly mounted along the rear edge of the vehicle body bottom, a second gate member pivotally mounted on the other edge of said first member for swinging about an axis parallel to said first mentioned hinged connection with the truck body, a plurality of bar members fixed to the outer upper face of said second gate member and projecting above and beyond the pivotal connection of said second member with said first member, and horizontal bar means interconnecting the outer ends of all of said vertically disposed bar members, so as to provide air discharge openings between said vertically disposed bar members and said horizontally disposed bar means and the edges of both of said gate members when in closed traveling position on the vehicle body.

4. In a folding tail gate structure for a stock carrying vehicle, a first gate member, means for hingedly connecting one edge of said gate member for horizontal swinging movement on the rear edge of the truck body bottom, a second gate member pivotally mounted for horizontal swinging movement parallel to said first swinging movement of said first member on the vehicle body at an outer edge of said first gate member, means for limiting swinging movement of said second member on said first member comprising a plurality of bar members fixed to the upper outer face of said second gate member, and a cross bar member fixed to the outer ends of said first mentioned plurality of bar members so as to form a stop and cleat device when both of said gate members are lowered to discharge and loading position and to form a rail and air passage structure when said lower member is swung upwardly to vertical position and said second gate member is swung downwardly back against the underside of said first gate member when said vehicle is in traveling condition.

HARRY G. TROTH.
FAYE G. DAMMANN.

REFERENCES CITED

The following references are of record in the file of this patent:

UNITED STATES PATENTS

| Number | Name | Date |
|---|---|---|
| 362,356 | Braun | May 3, 1887 |
| 1,384,713 | Stephens | July 12, 1921 |
| 1,723,469 | De Roos | Aug. 6, 1929 |